H. McKENZIE.
Apparatus for Evaporating Tannic Extracts.
No. 150,596. Patented May 5, 1874.
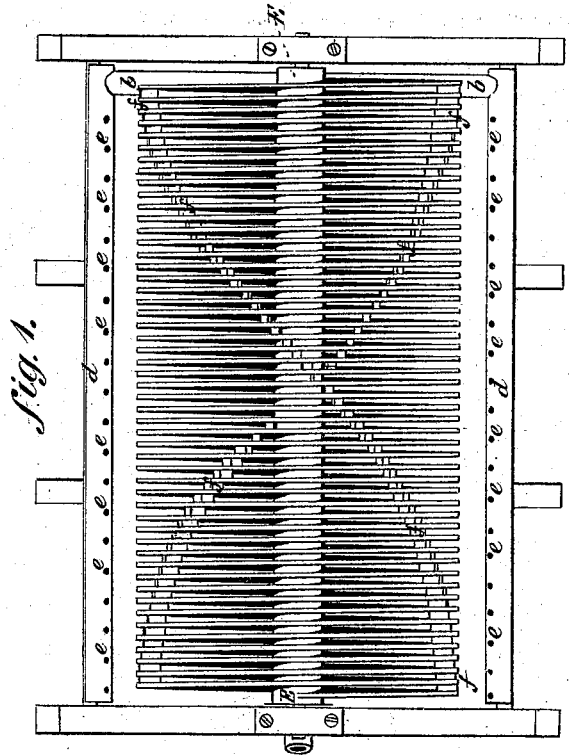
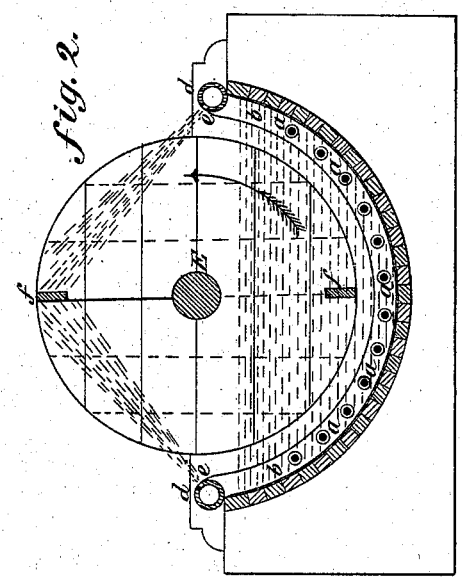
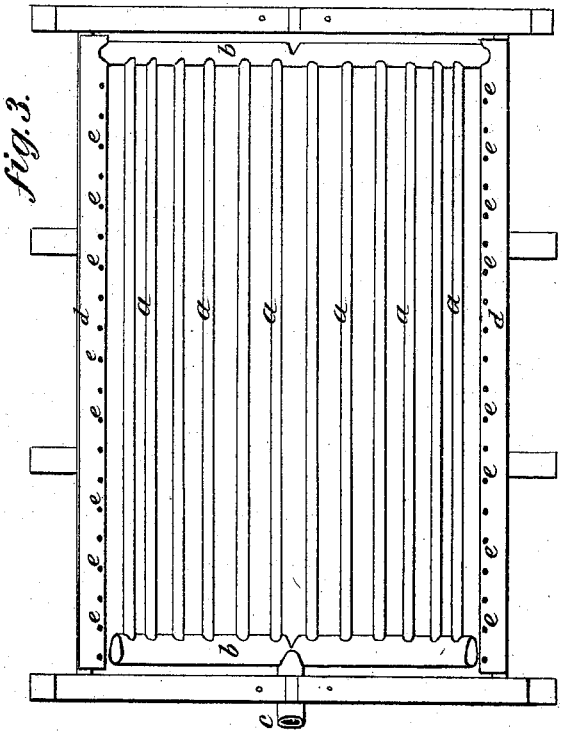
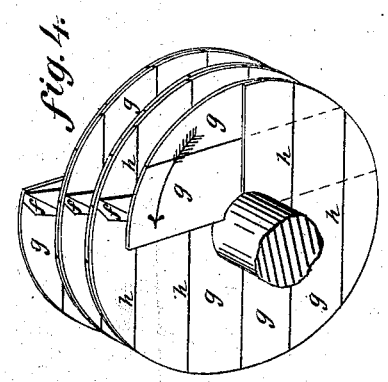
Inventor:
Henry McKenzie,
by Johnson and Johnson, Att'ys.
Witnesses:

UNITED STATES PATENT OFFICE.

HENRY McKENZIE, OF MARQUETTE, MICHIGAN.

IMPROVEMENT IN APPARATUS FOR EVAPORATING TANNIC EXTRACTS.

Specification forming part of Letters Patent No. 150,596, dated May 5, 1874; application filed May 1, 1874.

*To all whom it may concern:*

Be it known that I, HENRY McKENZIE, of the city of Marquette, in the county of Marquette and State of Michigan, have invented certain new and useful Improvements in Apparatus for Evaporating Tannic Extracts; and I do hereby declare that the following is a full, clear, and exact description thereof, which will enable others skilled in the art to which it pertains to make and use the same, reference being had to the accompanying drawings, and to the letters of reference marked thereon, which form a part of this specification.

My invention relates to evaporators for extracts in which the liquor is subjected to the evaporating action by means of revolving screw-disks; and the particular features of my invention consist in the combination of heating-pipes in the bottom of the trough with fixed perforated pipes on each side of the screw, whereby the liquor is submitted to the combined action of heat and heated air, which, yielding a portion of its heat directly within the body of the liquor, passes under pressure to the discharge-pipes above the liquor, from which it is projected obliquely upward toward the central circumference of the screw by upwardly-ranging perforations, and thereby effects a rapid absorption and displacement of the vapors given off by the liquor, and concentrates it more rapidly under the influence of the hot air, which first heating the pipes to generate the vapors passes off to absorb and carry them away by the projection of the air-currents so as to form a drying canopy over and around the screw from its opposite sides. Another new feature is a compound screw to produce a thorough commingling of the liquor and a more rapid evaporation thereof—that is to say, a screw in which the plates are placed spirally in the direction of their axis, in combination with a screw formed by short pieces advancing obliquely in echelons between and within the main screw, the combined effect of which from one and the same motion is to produce a series of strong countercurrents throughout the body of the liquor in the trough, whereby a more uniform heat is obtained and the heavier portions of the liquor prevented from gravitating to the bottom; also, in the construction of the screw-plates to prevent warping and breaking.

In the accompanying drawings, Figure 1 represents a top view of an evaporating apparatus embracing my invention; Fig. 2, a transverse section of the same; Fig. 3, a top view of the trough and arrangement of piping; and Fig. 4, a view of several of the screw-plates, showing its peculiar mode of construction.

The trough to receive the liquor is made semi-cylindrical, of wood and of any desired size, and within it revolves the screw. Upon the bottom of the trough is laid an arrangement of piping, $a$, designed to be submerged in the liquor to be evaporated. These pipes $a$ are united with curved end pipes $b$, with one of which is connected the inlet-pipe $c$; the other with the discharge-pipes $d\ d$, which lie horizontally upon the upper edges of the trough, so as to occupy positions on opposite sides of the screw, these pipes $d$ having perforations $e$ ranging obliquely upward toward the central circumference of the screw, and from which perforations issues the heated air, which being admitted through the inlet-pipe $c$ traverses simultaneously the bottom pipes $a$, leaving by radiation a considerable portion of its heat within the liquor; thence passing into and out of the side perforated pipes in upward oblique directions upon and between the surfaces of the screw, forming around and over it a canopy of hot drying air, which is exceedingly favorable to the rapid absorption of the aqueous vapors thrown off from the body of the liquor, and by means of the joint force of these oblique currents the vapors are carried upward and away from the evaporator, and thereby very effectively facilitating the operation. The screw-plates are mounted upon a shaft, E, turning in suitable bearings, and its operation raises and exposes thin sheets of liquor to the action of the heated air currents and at the same time producing a strong forward movement of the liquor in the same direction with the screw.

In conjunction with the movement of the liquor just described, it has also imparted to it a counter movement by means of a screw running obliquely to the axial line of the main screw, and at the periphery of the plates thereof, and formed by short pieces $f$, placed between and joining the edges of the plates and within their circumference. Any desired number of these oblique lines of short pieces can be laid within the circumference of the screw, their function being to effect a thorough commingling of the light and heavy liquors, and at the same time create a movement thereof counter to that produced by the screw-plates; for it will be seen that as the two screws occupy the relation to each other of a diameter and a surface oblique position they must necessarily produce opposite effects upon the liquor from one and the same motion of the compound screw.

As the construction of the screw of other material than wood is too expensive, and as wood blades of single thickness are liable to warp and break apart under the combined action of heat and moisture, I therefore overcome these serious objections by constructing the screw-blades of two thicknesses, each being composed of several sections, $g$, the divisional lines $h$ of the sections of each thickness being approximately at right angles. These two thicknesses are simultaneously built up and riveted together on the shaft, forming a solid screw-blade of great strength and rigidity, and dispensing entirely with all bracing devices hitherto found necessary even in the construction of plain disks.

The state of the art shows that screw-evaporators are not new, and that in connection with such both hot air and steam have been used conjointly; but in no instance am I aware that a compound wood-screw has been used to obtain the advantages stated, or that hot air has been employed to first generate and then absorb and carry away aqueous vapors.

I claim—

1. In an evaporator, the heating-pipes $a$, in combination with the side-perforated pipes $d$, connected, as described, with the inlet-pipe $c$, whereby a current of heated air first generates and then absorbs, and carries away aqueous vapors from the body of the liquor, substantially as described.

2. The pipes $d\ d$, having their perforations $e$ ranging obliquely upward toward the central circumference of the screw, to project the air around and upon the screw-blades, in the manner and for the purpose described.

3. A compound screw for fluid-evaporators, consisting of a diameter and an oblique surface-screw, to operate as described.

4. The blades of an evaporating-screw constructed of two thicknesses of separate and distinct sections, $g$, the divisional lines $h$ of each thickness being laid approximately at right angles, as and for the purpose described.

5. A screw-evaporator having a surface-screw formed of short pieces $f$, advancing in echelons between and within the main screw, substantially as described.

In testimony that I claim the foregoing as my own, I have affixed my signature in presence of two witnesses.

HENRY McKENZIE.

Witnesses:
 A. E. H. JOHNSON,
 J. W. HAMILTON JOHNSON.